March 3, 1970     R. C. BECKWITH ET AL     3,497,893

DOCKBOARD ASSEMBLY

Filed Oct. 10, 1967

INVENTORS.
Robert C. Beckwith &
BY Robert W. Hecker

Barnard, McGlynn & Reising
ATTORNEYS

United States Patent Office 3,497,893
Patented Mar. 3, 1970

3,497,893
DOCKBOARD ASSEMBLY
Robert C. Beckwith, Milwaukee, Wis., and Robert W. Hecker, Jr., Clare, Mich., assignors to Loomis Machine Company, Clare, Mich., a corporation of Michigan
Filed Oct. 10, 1967, Ser. No. 674,240
Int. Cl. B65g 11/12; E01d 15/04
U.S. Cl. 14—71                                    13 Claims

ABSTRACT OF THE DISCLOSURE

A dockboard assembly including a support structure with a generally C-shaped channel member supported by the support structure through a plurality of rollers with a ramp means operatively supported by the channel member whereby the ramp means may be moved horizontally by moving the channel member horizontally along the support structure. A brake block is supported by the channel member and is normally spaced from the support structure but engages the support structure when the ramp means is in the substantially horizontal position to prevent the channel member from moving horizontally relative to the support structure.

---

It is, therefore, an object and feature of this invention to provide a dockboard assembly which is movable horizontally by way of novel structural combinations.

Another object and feature of this invention is to provide a dockboard assembly having an improved and novel brake means for selectively preventing horizontal movement of the dockboard assembly relative to the support structure.

Other objects and attendant advantages of the present invention will be readily appreciated as the same becomes better understood by reference to the following detailed description when considered in connection with the accompanying drawings wherein.

Figure 1:
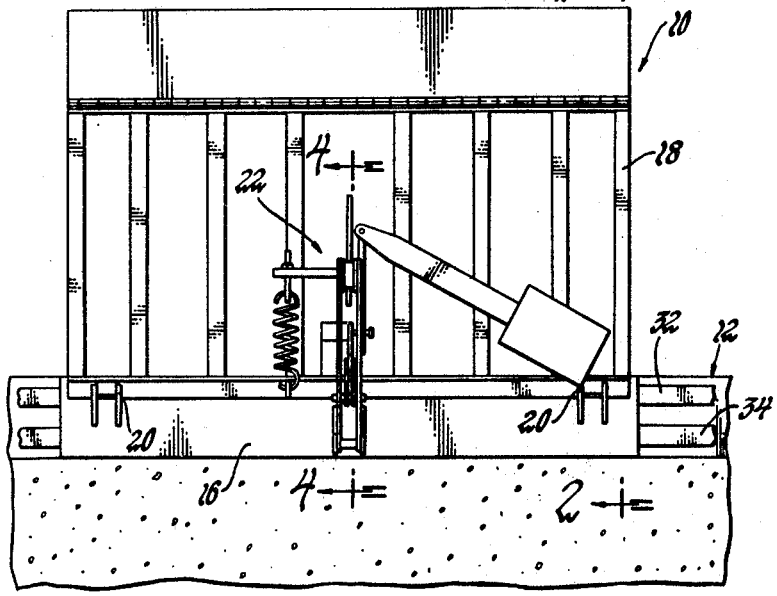
FIGURE 1 is an elevational view of a preferred embodiment of the dockboard assembly of the instant invention.

Referring now to the drawings, a preferred embodiment of the dockboard assembly of the instant invention is generally shown at 10.

Figure 2:
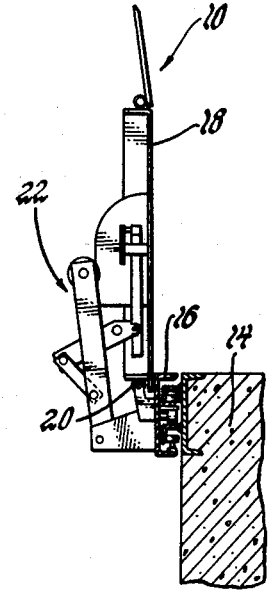
FIGURE 2 is a view taken substantially along line 2—2 of FIGURE 1.
Figure 3:
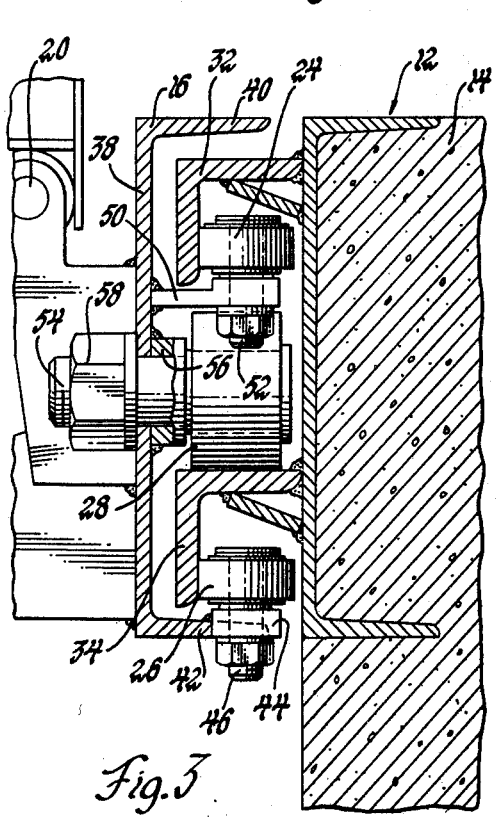
FIGURE 3 is an enlarged fragmentary cross-sectional view also taken along line 2—2 of FIGURE 1.

The dockboard assembly includes a support structure generally shown at 12 and secured to the front of a cement dock 14. There is also included a channel member 16 which supports the ramp means 18. The ramp means 18 is of the type described and claimed in copending application Ser. No. 657,989 filed Aug. 2, 1967 in the name of Robert C. Beckwith and Robert W. Hecker, Jr. and assigned to the assignee of the instant application. The ramp means 18 is pivotally connected through the hinge assemblies 20 to the channel member 16 and includes a lift means generally indicated at 22 and which is utilized in moving the ramp means 18 between the stored substantially vertical position, as illustrated in FIGURES 1 and 2, and a lowered substantially horizontal position which is not illustrated. In the lowered position the ramp means 18 extends between the dock 14 and a vehicle adjacent the dock for allowing traffic to pass between the dock 14 and the vehicle.

There is also included a plurality of rollers adjacent each end of the channel member 16 and operatively connecting the channel member 16 to the support structure for allowing the channel member 16 to move horizontally along the support structure 12.

The support structure 12 includes a second substantially C-shaped channel member 30, which as illustrated, is secured to the cement dock 14, and an elongated pair of vertically spaced substantially right angle members 32 and 34. The upper and lower right angle members 32 and 34 are welded or otherwise secured to the channel member 30 and bracing members 36 interconnect the right angle members 32 and 34 with the channel member 30 to provide additional support for the right angle members 32 and 34.

The rollers 24, 28 and 26 are supported by the first channel member 16 and rollingly engage the right angle members 32 and 34. The channel member 16 has a cross section including a vertical front plate 38 and flanges 40 and 42 extending rearwardly from the upper and lower extremities thereof respectively. The right angle members 32 and 34 are attached to the channel member 30 so as to present vertical or downwardly extending flanges.

There are three rollers, rollers 24, 26 and 28, disposed adjacent each end of the channel member 16. The first roller 26 is supported for rotation about a vertical axis by the lower flange 42 of the channel member 16. A block 44 is secured to the lower flange 42 as by welding a stud shaft 46 extends through the block 44 and is retained in position by a nut, the roller 26 being rotatable on the stud shaft 46. The roller 26 is in rolling engagement with the downwardly extending flange of the lower right angle member 34. The second roller 24 at each end of the channel member 16 is rotatably supported for rotation about a vertical axis by a bracket means 50 which extends from the front plate 38 of the channel member 16. The bracket means 50 is welded or otherwise secured to the front plate 38 and supports a stud shaft 52 which in turn rotatably supports the roller 24. The second roller 24 is in rolling engagement with the downwardly extending flange of the upper right angle member 32. The third roller 28 at each end of the channel member is supported for rotation about a horizontal axis by the front plate 38 of the channel member 16. A larger stud shaft 54 extends through a bearing block 56, which is in turn secured to the front plate 38, and rotatably supports the roller 28. The stud shaft 54 is held in position by the nut 58. The third roller 28 is in rolling engagement with the horizontal flange of the lower right angle member 34.

Figure 4:
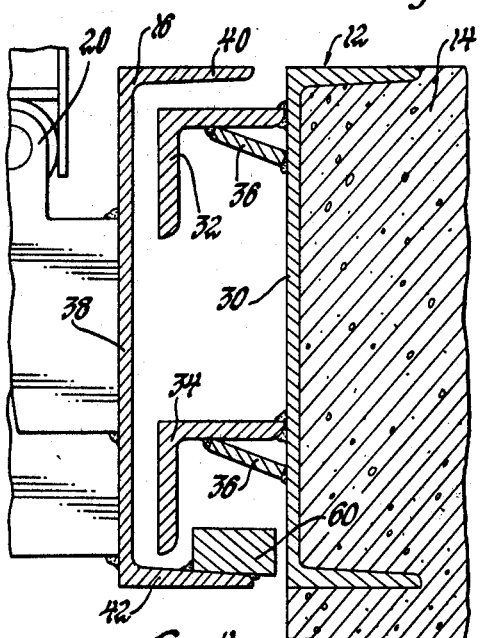
FIGURE 4 is an enlarged fragmentary cross-sectional view taken substantially along line 4—4 of FIGURE 1.

There is also included a brake means comprising the block 60 for interconnecting the channel member 16 and the support structure 12 at a position between the ends of the channel member 16 when the ramp means 18 is in the lowered position for preventing movement of the channel member 16 along the support structure. The block 60 is secured by welding or the like to the lower flange 42 of the channel member 16 and is normally slightly spaced from the channel member 30 of the support structure, as illustrated in FIGURE 4. As described above there are three rollers 24, 26 and 28 adjacent each end of the channel member 16. Thus, when the ramp means 18 is pivoted to the lowered substantially horizontal position, the weight of the ramp means 18 in addition to the weight of any object on the ramp means 18 is transferred through the lift means 22 to the central portion of the channel member 16 so that the channel member 16 has an inward bow between the ends thereof so that the block 60 is moved into engagement with the channel member 30 of the support structure, thus, preventing horizontal movement of the channel member 16 along the support structure 12. The rollers and the brake means therefore comprise a means operatively connecting the ramp means 18 to the support structure 12 for horizontal movement of the ramp means 18 along the support structure 12 and responsive to the ramp means for preventing horizontal movement thereof.

The dockboard assembly 10 as illustrated in the instant invention is frequently utilized in combination with a dock 14 adajacent a railroad track for loading and unloading railroad cars. The support structure 12 extends along the front face of the dock 14 so that the ramp means 18 may be moved horizontally along the dock 14 to various positions for loading or unloading railroad cars at different positions along the dock 14. The dockboard assembly 10 of the instant invention works very satisfactorily in such an environment since it is difficult if not impossible to position a railroad car so that its doors are opposite a dockboard which is horizontally stationary with respect to the dock 14, i.e. a dockboard which is not movable horizontally along the dock. It will be understood, of course, that the dockboard assembly of the instant invention may be utilized in combination with a dock for loading or unloading various vehicles.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A dockboard assembly comprising: a horizontal support structure, ramp means pivotally connected to said support structure for movement between raised and lowered positions, means operatively connecting said ramp means to said support structure for horizontal movement of said ramp means along said support structure and responsive to said ramp means for preventing said horizontal movement, said means including brake means actuated by said ramp means in the lowered position to engage said support structure to prevent said horizontal movement.

2. An assembly as set forth in claim 1 wherein said means also includes a channel member operatively connected to said support structure adjacent the ends thereof, said brake means being disposed between said ends for selectively interconnecting said channel member and said support structure to prevent said horizontal movement.

3. An assembly as set forth in claim 2 wherein said brake means comprises a block attached to said channel member and normally spaced from said support structure, said ramp means being operatively connected to said channel member for movement to and from a lowered generally horizontal position, and means responsive to said ramp means in said lowered position to move said channel member so that said block engages said support structure to prevent said horizontal movement of said ramp means.

4. A dockboard assembly comprising: a support structure, a channel member, a plurality of rollers operatively connecting said channel member to said support structure for allowing said channel member to move along said support structure, ramp means pivotally connected to said channel member for movement between raised and lowered positions, and brake means actuated by said ramp means for connecting said channel member and said support structure when said ramp is lowered to prevent movement of said channel member along said support structure.

5. A dockboard assembly comprising: a support structure; a channel member; a plurality of rollers operatively connecting the ends of said channel member to said support structure for allowing said channel member to move along said support structure; ramp means supported by said channel member; said support structure including an elongated pair of vertically spaced substantially right angle members; said rollers being supported by said channel member and disposed for engaging said right angle members for preventing said channel member from being disassociated from said support structure by movement relative thereto in any direction but along said support structure, each of said right angle members being disposed to present a generally vertical flange; said rollers at each end including a first roller supported for rotation about a vertical axis by said channel member and being in rolling engagement with the vertical flange of the lower right angle member, a second roller supported for rotation about a vertical axis by said channel member and being in rolling engagement with the vertical flange of the upper right angle member, and a third roller supported for rotation about a horizontal axis by said channel member and being in rolling engagement with the lower right angle member.

6. An assembly as set forth in claim 5 including at least one of said first, second and third rollers adjacent each end of said channel members.

7. An assembly as set forth in claim 6 wherein said channel member has a cross section including a vertical front plate with a flange extending rearwardly toward said support structure from the upper and lower extremities thereof, said first rollers being supported by the lower flange of said channel member, said second rollers being supported by a bracket means extending from said front plate, said third roller being supported by said front plate.

8. An assembly as set forth in claim 7 including brake means for selectively preventing movement of said channel member along said support structure.

9. An assembly as set forth in claim 7 wherein said ramp means is pivotally connected to said channel member for movement between raised and lowered positions.

10. An assembly as set forth in claim 9 including brake means connecting said channel member and said support structure at a position between the ends of said channel member when said ramp means is in said lowered position for preventing movement of said channel member along said support structure.

11. An assembly as set forth in claim 10 wherein said brake means comprises a block secured to said front plate and normally slightly spaced from said support structure, and means for bowing said channel member and moving said block against said support structure when said ramp means is in said lowered position.

12. An assembly as set forth in claim 11 wherein said support structure includes a second channel member, said right angle members being attached to said second channel member.

13. A dockboard assembly comprising: a support structure, a member operatively connected adjacent the ends thereof to said support structure for movement therealong, ramp means pivotally connected to said member for movement between raised and lowered positions, means reacting between said ramp means and said member to move at least the central portion thereof toward said support structure when said ramp means is supporting a load, and brake means responsive to the movement of said central portion toward said support structure and reacting between said member and said support structure for preventing movement of said member relative to said support structure.

References Cited
UNITED STATES PATENTS 2,592,919   4/1952   Loomis et al. _____ 14—71
3,018,496   1/1962   Hosbein _____ 14—71

JACOB L. NACKENOFF, Primary Examiner